(12) United States Patent
Blair

(10) Patent No.: US 7,043,971 B2
(45) Date of Patent: May 16, 2006

(54) SYSTEM FOR DETECTING SLIDING OF A WHEEL TRAVELLING ALONG A TRACK

(75) Inventor: Jim Blair, West Perth (AU)

(73) Assignee: JRB Engineering Pty Ltd., West Perth (AU)

( * ) Notice: Subject to any disclaimer, the term of this patent is extended or adjusted under 35 U.S.C. 154(b) by 205 days.

(21) Appl. No.: 10/670,391

(22) Filed: Sep. 26, 2003

(65) Prior Publication Data

US 2004/0064238 A1    Apr. 1, 2004

(51) Int. Cl.
*G01N 17/00* (2006.01)
(52) U.S. Cl. .......................................................... 73/86
(58) Field of Classification Search .................. 73/8, 73/86, 146, 865.9, 118.1; 33/203, 203.1; 246/169 R
See application file for complete search history.

(56) References Cited

U.S. PATENT DOCUMENTS

| | | | | |
|---|---|---|---|---|
| 3,657,601 A | * | 4/1972 | Darrow ...................... | 361/238 |
| 4,235,402 A | * | 11/1980 | Matty et al. .................. | 701/20 |
| 4,407,072 A | * | 10/1983 | Hoskins, Jr. .............. | 33/203.11 |
| 4,432,229 A | * | 2/1984 | Nowogrodzki ............... | 73/146 |
| 4,820,057 A | * | 4/1989 | Berndt ....................... | 374/141 |

FOREIGN PATENT DOCUMENTS

| | | |
|---|---|---|
| AU | 28285/92 | 5/1993 |
| AU | 55132/94 | 8/1995 |
| AU | 56182/96 B2 | 1/1997 |
| AU | 199942450 A1 | 2/2000 |
| AU | 199943490 A1 | 3/2000 |
| WO | 86/03582 A1 | 6/1986 |
| WO | 94/07730 A1 | 4/1994 |
| WO | 94/17422 A1 | 8/1994 |
| WO | 95/12803 A1 | 5/1995 |
| WO | 00/51869 A1 | 9/2000 |
| WO | 00/61419 A1 | 10/2000 |
| WO | 00/70148 A1 | 11/2000 |
| WO | 01/07308 A1 | 2/2001 |
| WO | 01/17837 A1 | 3/2001 |

* cited by examiner

*Primary Examiner*—Robert Raevis
(74) *Attorney, Agent, or Firm*—Buchanan Ingersoll PC

(57) ABSTRACT

A system 10 for detecting sliding of a wheel 12 on a rail 14 includes a roller 16 disposed adjacent the rail 14 so that a wheel 12 travelling along the rail 14 can engage the roller 16, and a tachometer 18 coupled with the roller 16 for providing a rotation signal representative of the degree of rotation of the roller. The system 10 includes a computer 20 which receives the rotation signal from the tachometer 18 and by using an appropriate rotation algorithm calculates the degree of rotation of the roller 16. The computer 20 then compares the degree of rotation with a predetermined range of roller rotations and, if the calculated degree of rotation of the roller is less than predicted by analysis, the apparatus 10 provides a signal indicative of the wheel 12 sliding.

24 Claims, 4 Drawing Sheets

SYSTEM FOR DETECTING SLIDING OF A WHEEL TRAVELLING ALONG A TRACK

FIELD OF THE INVENTION

The present invention relates to a system for detecting the sliding of a wheel travelling along a track, and in particular for detecting sliding of railway wheels. The invention further relates to a system for estimating tread wear on such wheels.

BACKGROUND OF THE INVENTION

Sliding of railway wheels travelling along a railway track occurs when the wheels on the corresponding rail vehicle are not rotating at the natural rotational speed equivalent to the vehicle's linear speed. When the wheels are braked either intentionally, or by a mechanical fault, beyond their limits of adhesion between the rails and the wheels, the wheels are said to be sliding.

Sliding wheels lead to damaged rails and wheels. Wheels that slide continuously can further lead to derailments of the associate vehicle or even the entire train. Further, wheels with worn tread do not track properly on the rails and lead to excessive rail and wheel wear.

A major challenge in the design of equipment to detect slipping or sliding wheels is the need for relatively inexpensive equipment which will operate dependably in the intensely hostile environment close to rail wheels.

Current systems are available which are based on vision equipment which takes repeated images of wheels and axles, and then by processing the image digitally measures forward velocity of the vehicle and the rotational velocity of the wheels. Assuming that the diameter of the wheels is known, the system can match the rotational velocity of the wheels to the forward speed of the vehicle thereby detecting slipping or sliding as a mismatch in these quantities.

This type of system is vulnerable to dust and rain, and also requires prior information about the rail wheel diameter. It is also difficult to apply to a number of vehicle designs where the wheel and axle rotation is difficult to detect visually.

SUMMARY OF THE INVENTION

It is an object of the present invention to provide a system for detecting sliding of wheels travelling along a track that will operate on all types of wheels without precise prior information on wheel diameter.

According to the present invention there is provided a system for detecting the sliding of a wheel travelling along a track comprising:
a roller rotatable about a rotation axis, said roller disposed adjacent said track so that a wheel travelling along said track engages said roller and causes the roller to rotate about said rotation axis;
a rotation sensor associated with said roller for providing a rotation signal representative of the degree of rotation of said roller; and
a processor for calculating the degree of rotation of said roller from said rotation signal and comparing said degree of rotation with a pre-determined range of degrees of roller rotations and providing a signal indicative of sliding of said wheel when said degree of rotation of said roller is outside said pre-determined range.

Preferably said system further comprises a suspension system for supporting said roller.

Preferably said suspension system comprises a bias device for biasing said roller into contact with said wheel to prevent slipping between said roller and said wheel.

Preferably said suspension system further comprises: a housing which rotatably supports said roller; and, a frame to which said housing is pivotally coupled to enable said housing to pivot about a pivot axis substantially perpendicular to said rotation axis.

Preferably said bias device acts between said housing and said frame.

Preferably said system further comprises a wheel detection mechanism for providing a wheel detect signal when a wheel is in contact with said roller.

Preferably said wheel detection mechanism comprises a sensor for sensing motion of said housing about said pivot axis.

Preferably said processor calculates said degree of rotation while said wheel detect signal is present.

Preferably said system further comprises a brake mechanism for preventing free rotation of said roller when not in contact with said wheel.

Preferably said system further comprises a wheel direction sensor which senses the direction in which said wheel is passing over said roller.

Preferably said wheel direction sensor comprises strain transducers on opposite sides of said rotation axis.

Preferably said strain transducers are mounted on opposite sides of said housing.

Preferably said processor is programmed with a counter to count the number of axles on which wheels passing said roller are mounted, where the counter is incremented by one when said wheel detection mechanism provides a wheel detect signal and said wheel direction sensor indicates said wheel passing in a first direction, and said count is decremented by one when said wheel detection mechanism provides a wheel detect signal and said wheel detection sensor indicates said wheel is passing second direction opposite to said first direction.

According to the invention there is also provided a system for detecting the slipping or sliding of a wheel travelling along a track comprising:
a roller and rotatable about a rotation axis disposed adjacent said track so that a wheel travelling along said track engages said roller;
a rotation sensor means associated with said roller for providing a rotation signal representative of the degree of rotation of said roller; and
a processor for calculating the degree of rotation from said rotation signal and comparing said degree of rotation with a pre-determined range of roller rotations and providing a signal indicative of slipping or sliding of said wheel when said degree of rotation is outside said re-determined range.

DETAILED DESCRIPTION OF PREFERRED EMBODIMENT

Figure 1:
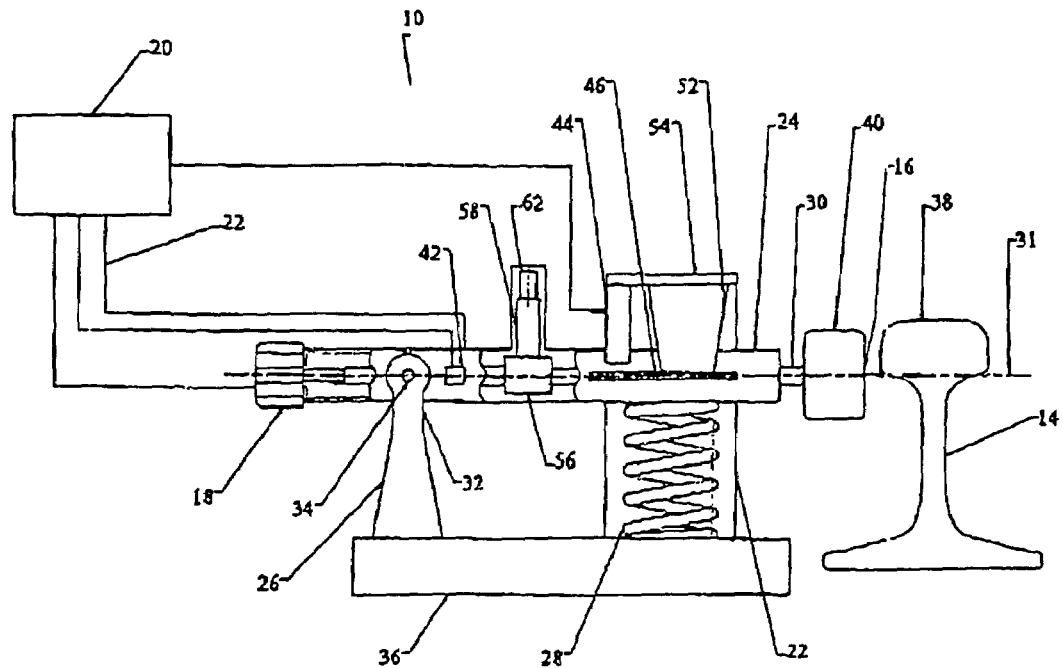
FIG. 1 is a side view of a first embodiment of the system for detecting sliding of wheels moving along a track.
Figure 2:
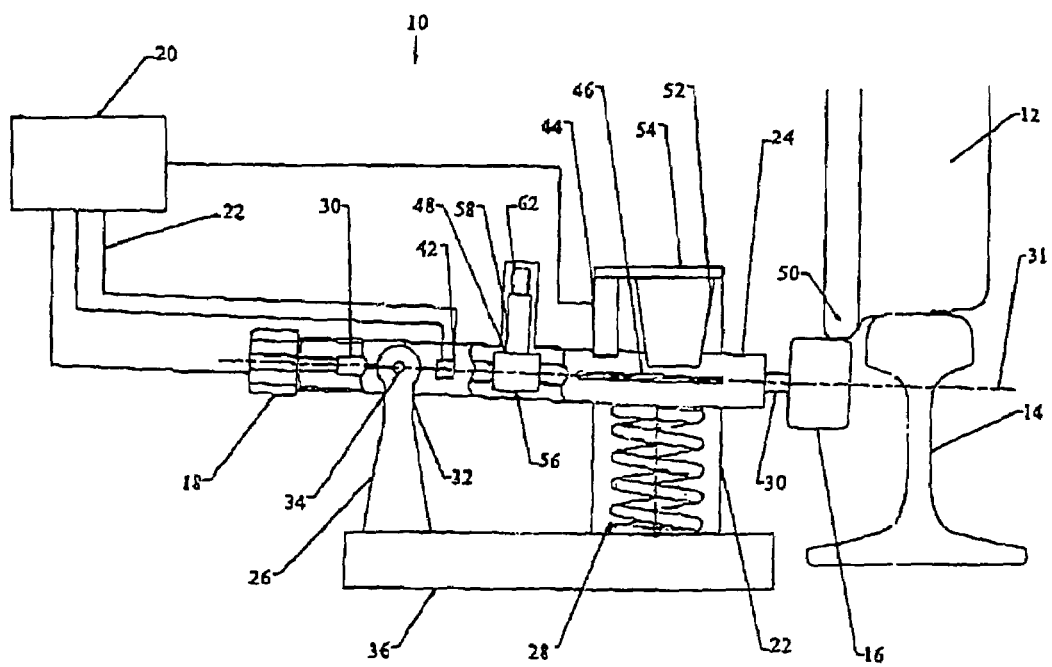
FIG. 2 is a view of the system depicted in FIG. 1 showing the passing of a wheel.

Referring to the accompanying drawings, and in particular FIGS. 1 and 2, a system 10 for detecting sliding of a wheel 12 on a track in the form of rail 14 comprises a roller 16 disposed adjacent the rail 14 so that a wheel 12 travelling along the rail 14 can engage the roller 16, and a rotation sensor in the form of a tachometer 18 (hereinafter referred to as "tacho 18") associated with the roller 16 for providing a rotation signal representative of the degree of rotation of the roller. A processor in the form of a computer 20 receives the rotation signal from the tacho 18 and using an appropriate rotation algorithm calculates the degree of rotation of the roller 16. Thereafter, the computer 20 compares the degree of rotation with a predetermined range of roller rotations and provides a signal indicative of the wheel 12 sliding when the degree of rotation is outside the predetermined range. The rotation signal from the taco 18 may be transmitted by line (e.g. electrical or optical cables) or by radio to the computer 20.

The roller 16 is supported by a suspension system 22 which includes a housing 24, frame 26, and a bias device in the form of spring 28.

The roller 16 is attached to a shaft 30 which is rotatably held within the housing 24. The housing 24 in effect acts as a bearing, rotatably supporting the roller 16 to rotate about a rotation axis 31 which is coincident with the longitudinal axis of shaft 30. The tacho 18 is attached to an end of the housing 24 opposite the roller 16 and is coupled to the shaft 30 to thereby sense the rotation of the roller 16. Housing 24 is pivotally attached to a pair of arms 32 (only one shown) of the frame 26 to pivot about pivot axis 34. The arms 32 extend upwardly from a base 36 of the frame 26. Spring 28 acts between the base 36 and the housing 24.

When there is no load on the roller 16 the upward pivoting of the housing 24 about pivot axis 34 is limited by a plate 46, attached to the housing 24, coming in contact with a buffer 52 attached to a bracket 54 which in turn is attached to the base 36 of the frame 26.

The suspension system 22 is arranged so that when there is no load on the roller 16 (i.e. no wheel 12 in contact with roller 16, and plate 46 contacting buffer 52) the roller is in such a position relative to the wheel 12 that it will be depressed by the wheel 12 passing over it.

A wheel direction sensor in the form of strain transducers or gauges 42 (only one shown) are provided on opposite sides of the rotation axis 31 are for sensing the direction in which the wheel 12 passes over the roller 16. The strain gauges 42 are mounted on opposite sides of the housing 24. Depending on the direction of passing of the wheel 12 over the roller 16, opposite sides of the housing 24 will be placed in tension and compression. This is detected by the strain gauges 42 which send signals to the computer 20 which may then be processed or analysed to provide information regarding the direction of passing of the wheel 12.

The system 10 further includes a wheel detection mechanism in the form of a proximity sensor 44 which provides a wheel detection signal when wheel 12 is in contact with the roller 16. The proximity sensor 44 senses changes in the distance between the sensor 44 itself and the plate 46 attached to the housing 24. As clearly seen by comparison with FIGS. 1 and 2, when wheel 12 is in contact with roller 16, the housing 24 pivots about axis 34 changing the distance between the proximity sensor 44 and the plate 46 thereby providing an indication of contact of the wheel 12 with the roller 16.

A braking mechanism 48 is incorporated in the housing 24 to prevent the free wheeling of the roller 16 after loss of contact with wheel 12.

The braking mechanism 48 consists of a brake drum 56 rigidly attached to shaft 30 against which a braking pad 58 is pressed by the spring 62 of adjustable length. The pressure applied to pad 58 by spring 62 is arranged to be such that the free rotation of roller 16 is inhibited.

The computer 20 is programmed with various algorithms and includes various look-up tables for processing signals from the tacho 18, strain gauges 42, and proximity sensor 44 and then provides appropriate indication as to whether or not the wheel 12 is sliding and also, provide an indication of the tread wear of the wheel 12.

Figure 3:
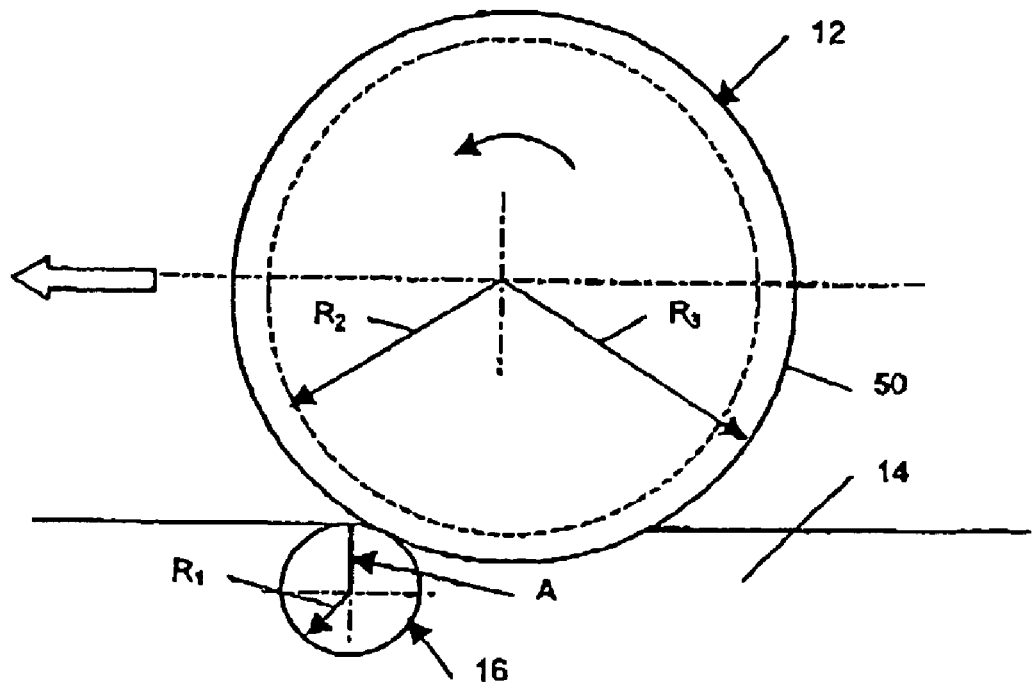
FIG. 3 is a schematic representation of a wheel making initial contact with a roller incorporated in the system.
Figure 4:
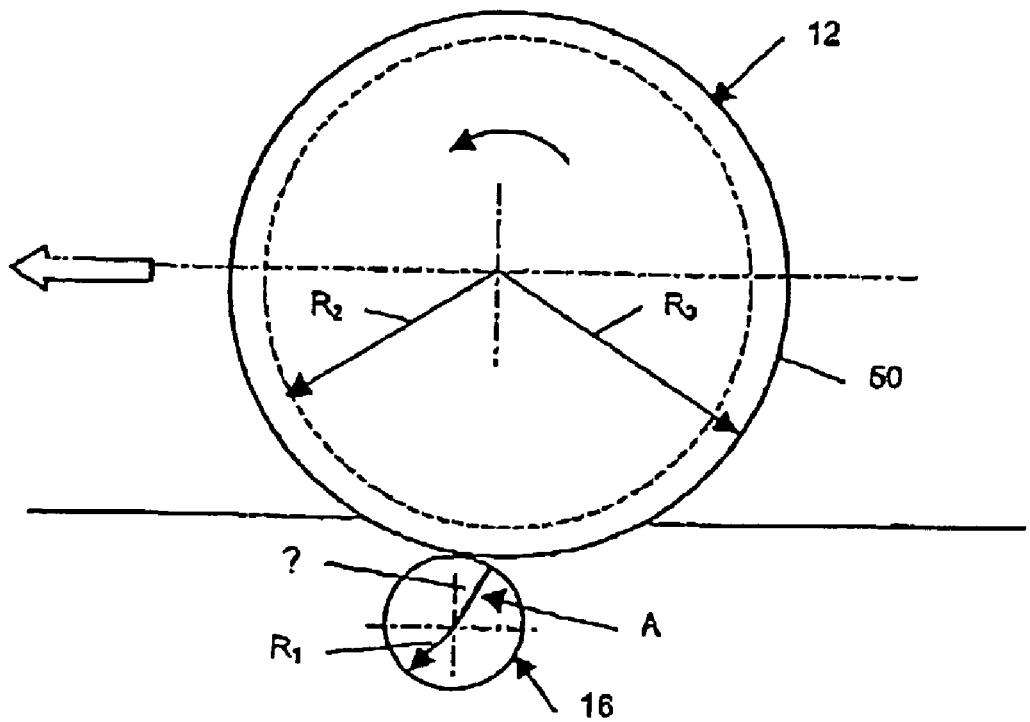
FIG. 4 is a schematic representation of the wheel directly over the roller.
Figure 5:
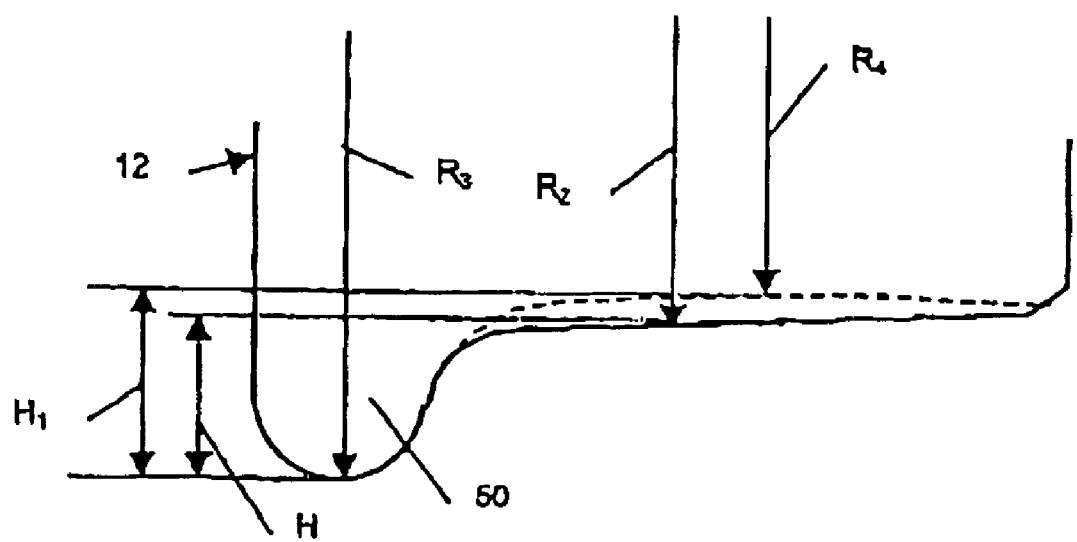
FIG. 5 is a section of a wheel showing tread wear.

With reference to FIGS. 3–5, the magnitude and direction of rotation of the roller 16 as the result of the complete passage of the wheel 12 is determined by the following factors:

(a) radius $R_1$ of the roller 16.
(b) radius $R_2$ of the tread of the wheel 12 (also known as the rolling radius of wheel 12), and
(c) flange height H, which is the difference between flange radius $R_3$ and the wheels rolling radius $R_2$.

When the wheel 12 passes from right to left (referring to FIGS. 3 and 4), flange 50 of the wheel 12 rolling on the roller 16 will cause the roller to rotate clockwise from an initial position A through an angle θ. The degree of rotation θ is precisely defined in terms of the factors (a) to (c) mentioned above when the wheel 12 rolls without slipping or sliding on the rail 14.

Figure 6:
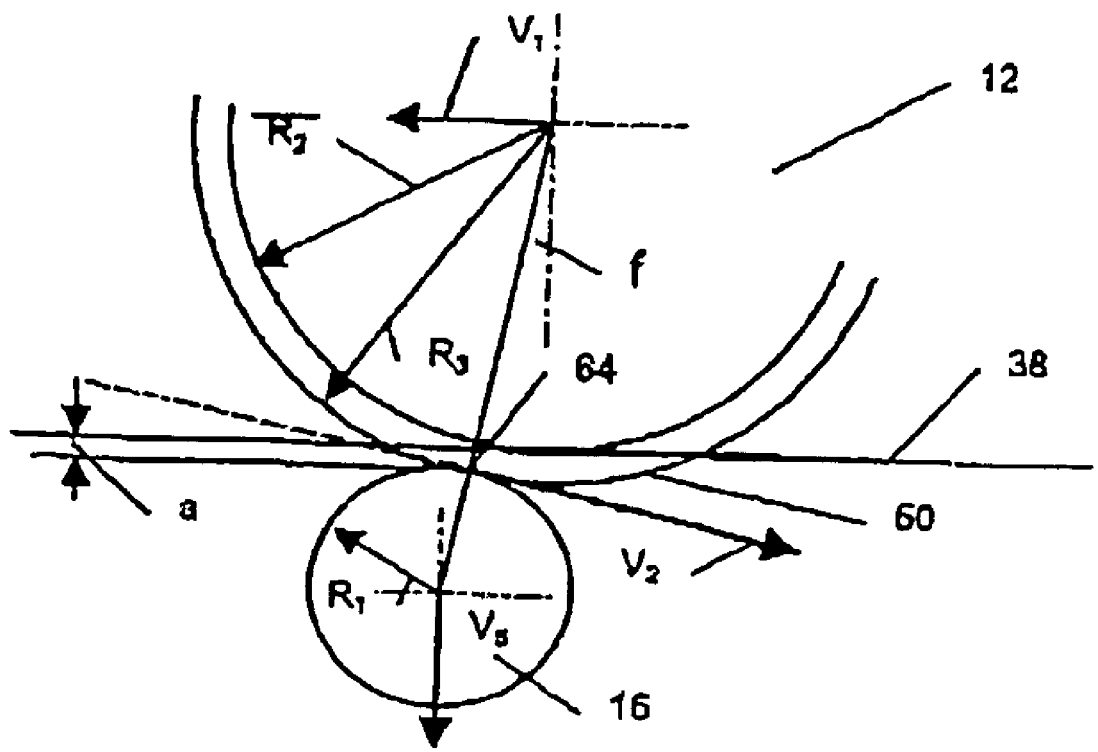
FIG. 6 shows the roller depressed below the track rail.
Figure 7:
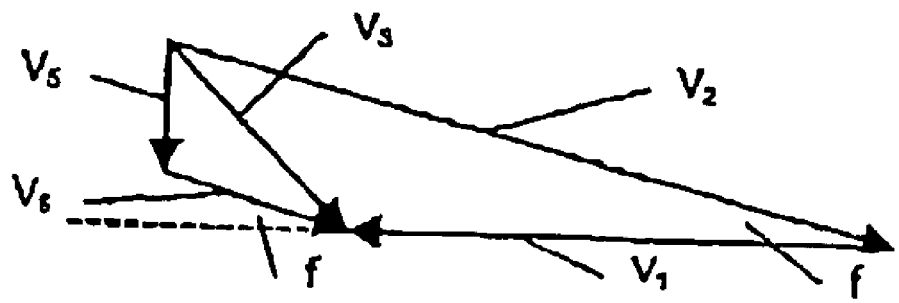
FIG. 7 shows velocity vectors associated with the wheel and roller at instant shown in FIG. 6.

The relationship can be derived with reference to FIGS. 6 and 7.

The center of the wheel 12 is moving along the rail with velocity $V_1$. Relative to the wheel center the point of contact 64 between wheel flange 50 and the roller 16 is moving at a velocity $V_2$ where:

$$V_2 = V_1 \times R_3/R_2$$

At the instant depicted by FIG. 6 when the top of the roller 16 is a distance 'a' below the top of the rail 38, the direction of the velocity vector $V_2$ is at right angles to the line joining the center of the wheel 12 and roller 16. This line makes an angle θ with the vertical.

The absolute velocity $V_3$ of the point of contact 64 is obtained from the addition of the vectors $V_1$ and $V_2$ as shown in FIG. 7.

When there is no slipping between wheel 12 and roller 16 $V_3$ is also the absolute velocity of the point of contact 64 on the surface of roller 16. The common velocity vector $V_3$ can be resolved into a vertically downward vector $V_5$, which is the downward velocity of the center of roller 16, and a velocity component $V_6$ which is the tangential velocity of the point of contact 64 on the surface of roller 16.

The instantaneous angular velocity ω of the roller 16 is found from the relationship:

$$\omega = V_6/R_1$$

The total angular rotation θ of the roller 16 caused by the wheel 12 passing over it is found by integrating with respect to time the value of ω from the instant of contact between wheel 12 and roller 16 until they separate.

If the wheel 12 slides (due to braking, or a locking of brakes) on the rail 14, then the angle θ will be less than predicted by analysis. Here, the expression "less" takes account of the directional sense of rotation of the roller 16 where a rotation of the roller 16 opposite to that expected when the wheel 12 rolls over the roller 16 without slipping or sliding is taken as a negative quantity.

For example, for a wheel 12 with a rolling radius $R_2$ of 450 mm, flange height H of 30 mm, and a roller radius $R_1$ of 50 mm, the passing of the wheel 12 over the roller 16 without slipping or sliding will cause the roller 16 to rotate through an angle θ of +19.1 degrees. Typically, for the same configuration, a locked wheel 12 sliding along the track 14 and roller 16 will cause the roller 16 to rotate through an angle θ of −372 degrees. A partially sliding wheel 12 will cause rotation of roller 16 through an angle θ of between +19.1 and −372 degrees. Should the wheel 12 be slipping as it passes over the roller 16, then it will cause the roller 16 to rotate through an angle θ of more than 19.1 degrees.

The computer 12 is programmed with an algorithm which computes the degree of rotation of the roller 16 upon receipt of signals from the taco 18 and then compares that rotation with a predetermined range of rotations (for example positive +18 to +20 degrees) and then provides a signal that the wheel is sliding if the measured actual rotation of the roller 16 falls below the predetermined range. Of course, the computer 20 may also provide and/or display an exact measure of the degree of rotation of roller 16 which may then by itself be used as an indication of whether or not the wheel 12 is sliding.

The algorithm for calculating the degree of rotation of the roller 16 may be stopped and started by pulses received from the proximity sensor 44. That is, when the wheel 12 initially contacts the roller 16 causing the roller 16 and housing 24 to pivot about axis 34, the proximity sensor 44 sends a signal to the computer 20 providing a flag that the wheel 12 is in contact with the roller 16. At this time computer commences the algorithm for determining the degree of rotation of roller 16. When the wheel has finished passing the roller 16 and loses contact, the proximity sensor 44 sensing the return of the roller 16 and housing 12 to the equilibrium position, issues a further pulse to the computer 20 which acts as a termination pulse to the algorithm for determining the degree of rotation of the roller 16. This also provides a degree of confidence in the measurements and indications provided by the computer 20 as a rotation calculation will only be made at the same time that a wheel 12 is detected as being in contact with the roller 16.

Due to the geometry of the system 10, the degree of rotation θ of the roller 16 is more sensitive to the flange height H than the diameter $R_2$. If the wheel tread is worn from its original radius $R_2$ to a radius $R_4$ (See FIG. 5), the flange height H is effectively increased to $H_1$.

Typically for a wheel 12 of rolling radius $R_2$ of 450 mm and nominal flange height H of 30 mm, that has 5 mm of tread wear the new rolling radius $R_4$ will be 445 mm, the effective flange height $H_1$ will be 35 mm and the roller 16 will now rotate through an angle θ of positive 23.3 degrees. With this configuration, the roller 16 rotates an additional 0.84 degrees per milimetre of tread wear.

The computer 20 is further provided with a counter algorithm (counter) for counting the number of new axles on which wheels 12 passing over the roller 16 are mounted. The counter is incremented by one when the proximity sensor 44 provides a signal that a wheel 12 has passed the roller 16 and the strain gauge 42 provides a signal indicative of the wheel 12 passing in a first direction. The counter is decremented by one when the proximity sensor provides a signal that a wheel has passed the roller 16 and the strain gauge 42 provides an indication that the wheel has passed in a second opposite direction. In this way, the computer 22 can correlate the indication of whether or not a wheel is sliding with the axle of a vehicle on which that wheel is mounted.

As the system 10 is able to sense the degree of rotation of roller 16, the presence or absence of a wheel 12 passing over the roller 16, and the direction in which the wheel 12 is passing over the roller, appropriate algorithms and software can be written to provide various measurements and signals relating to the characteristics of the wheel 12. As previously mentioned, the computer 20 can be suitably programmed to provide an indication as to whether or not a wheel 12 is sliding by comparing the degree of rotation of the roller 16 in contact with that wheel with a predetermined range of roller rotations. The computer 20 can effectively tag a wheel or at least the axle containing the wheel which gives rise to a sliding indication by virtue of the count algorithm mentioned above. A tread wear algorithm may be programmed into the computer 20 for estimating tread wear of the wheel 12 on the basis of the degree of rotation of the roller 16. Various alarms may be associated with or controlled by the computer 20 to announce that a wheel is sliding, or has a tread wear greater than an arbitrary limit. Alarm signals may also be raised if the proximity sensor 44 provides an indication that a wheel 16 is passing the roller 12 but there is no accompanying signal from the taco 18 providing an indication that the roller 16 is rotating. Conversely, an alarm may be raised in the event that the taco 18 produces a rotation signal indicative of the roller 16 rotating without the proximity sensor 44 being activated to produce a signal that a wheel 12 is passing. In addition, a further alarm may be raised in the event that the sensor 44 is activated producing an indication that a wheel 12 is passing the roller 16 but without any accompanying signal from the strain gauges 42.

Now that an embodiment of the present invention has been described in detail it will be apparent to those skilled in the relevant arts that numerous modifications and variations may be made without departing from the basic inventive concepts. For example, the system 10 is depicted as being used in relation to horizontally lying track 14. However the system may of course be used in conjunction with tracks that extend is vertical planes or planes of other inclination. Also while the system 10 is described in relation to the use with railway wheels, it may be used in conjunction with other wheels or other types of rolling members such as pulleys. In addition the system 10 can also be operated to provide an indication of slipping of a wheel. Slipping occurs when a powered axle/wheel looses grip with a track on which it travels. In such a situation the wheel's rotational speed is higher than the natural rotational speed equivalent of the vehicles linear speed. In terms of the system 10, if a wheel were to slip when passing over roller 16, the roller would rotate through a greater angle than a wheel passing over the roller which is not slipping or sliding. Thus by appropriately programming the computer 20 to provide a "slipping indication" if the angle θ is larger than the predetermined range, the slipping of a wheel can also be detected. It will be appreciated that this requires only a very simple modification to the program/algorithm for detecting sliding of a wheel. With particular reference to the example at page 9, lines 11 to 17, should the wheel 12 be slipping as it passes over the roller 16, then it will cause the roller 16 to rotate through an angle θ of more than 19.1 degrees.

All such modifications and variations are deemed to be within the scope of the present invention the nature of which is to be determined from the above description and the appended claims.

The claims defining the invention are as follows:

1. A system for detecting the sliding of a wheel travelling along a track comprising:
   a roller rotatable about a rotation axis, said roller disposed adjacent said track so that a wheel travelling along said track engages said roller and causes the roller to rotate about said rotation axis;
   a rotation sensor associated with said roller for providing a rotation signal representative of the degree of rotation of said roller; and
   a processor for calculating the degree of rotation of said roller from said rotation signal and comparing said degree of rotation with a pre-determined range of degrees of roller rotations and providing a signal indicative of sliding of said wheel when said degree of rotation of said roller is outside said pre-determined range.

2. The system according to claim 1, comprising a suspension system for supporting said roller.

3. The system according to claim 2, wherein said suspension system includes a bias device for biasing said roller into contact with said wheel.

4. The system according to claim 3, wherein said suspension system further comprises:
   a housing which rotatably supports said roller; and, a frame to which said housing is pivotally coupled to enable said housing to pivot about a pivot axis substantially perpendicular to said rotation axis.

5. The system according to claim 4, wherein said bias device acts between said housing and said frame.

6. The system according to claim 1, further comprising a wheel detection mechanism for providing a wheel detect signal when a wheel is in contact with said roller.

7. The system according to claim 6, further comprising a housing which rotatably supports said roller; and, a frame to which said housing is pivotally coupled to enable said housing to pivot about a pivot axis substantially perpendicular to said rotation axis and wherein said wheel detection mechanism comprises a sensor for sensing motion of said housing about said pivot axis.

8. The system according to claim 6, wherein said processor calculates said degree of rotation while said wheel detect signal is present.

9. The system according to claim 1, further comprising a brake mechanism for preventing free rotation of said roller when not in contact with said wheel.

10. The system according to claim 1, further comprising a wheel direction sensor for sensing the direction in which the said wheel is passing over said roller.

11. The system according to claim 10, wherein said wheel direction sensor includes strain transducers on opposite sides of said rotation axis.

12. The system according to claim 11, further comprising a housing that rotatably supports said roller and wherein said strain transducers are mounted on opposite sides of said housing.

13. The system according to claim 6, wherein said processor is programmed with a counter to count the number of axles on which wheels passing said roller are mounted, where the counter is incremented by one when said wheel detection mechanism provides a wheel detect signal and said wheel direction sensor indicates said wheel passing in a first direction, and said count is decremented by one when said wheel detection mechanism provides a wheel detect signal and said wheel detection sensor indicates said wheel is passing second direction opposite to said first direction.

14. The system according to claim 1, wherein said processor is programmed with an algorithm for estimating tread wear of said wheel on a basis of said rotation signal.

15. A system for detecting the slipping or sliding of a wheel travelling along a track comprising:
   a roller and rotatable about a rotation axis disposed adjacent said track so that a wheel travelling along said track engages said roller;
   a rotation sensor associated with said roller for providing a rotation signal representative of the degree of rotation of said roller; and
   a processor for calculating the degree of rotation from said rotation signal and comparing said degree of rotation with a pre-determined range of roller rotations and providing a signal indicative of said wheel sliding when said degree of rotation is less than said pre-determined range, and providing a signal indicative of said wheel slipping when said degree of rotation is greater than said predetermined range.

16. The system according to claim 15, further comprising a wheel detection mechanism for providing a wheel detect signal when a wheel is in contact with said roller.

17. The system according to claim 16, further comprising a housing which rotatably supports said roller; and, a frame to which said housing is pivotally coupled to enable said housing to pivot about a pivot axis substantially perpendicular to said rotation axis and wherein said wheel detection mechanism comprises a sensor for sensing motion of said housing about said pivot axis.

18. The system according to claim 16, wherein said processor calculates said degree of rotation while said wheel detect signal is present.

19. The system according to claim 15, further comprising a brake mechanism for preventing free rotation of said roller when not in contact with said wheel.

20. The system according to claim 15, further comprising a wheel direction sensor for sensing the direction in which the said wheel is passing over said roller.

21. The system according to claim 20, wherein said wheel direction sensor includes strain transducers on opposite sides of said rotation axis.

22. The system according to claim 21, further comprising a housing that rotatably supports said roller and wherein said strain transducers are mounted on opposite sides of said housing.

23. The system according to claim 22, wherein said processor is programmed with a counter to count the number of new axles on which wheels passing said roller are mounted, where the counter is incremented by one when a wheel detection mechanism provides a wheel detect signal and said wheel direction sensor indicates said wheel passing in a first direction, and said count is decremented by one when said wheel detection mechanism provides a wheel detect signal and said wheel direction sensor indicates said wheel is passing second direction opposite to said first direction.

24. A method for detecting the slipping or sliding of a wheel traveling along a track comprising:
   providing adjacent to the track, a roller rotatable about an axis of rotation, the roller being disposed so that a wheel traveling along the track engages the roller;
   providing to a processor a rotation signal representative of a degree of rotation of said roller;

operating the processor to calculate the degree of rotation of the roller from said rotation signal and comparing the degree of rotation with a pre-determined range of roller rotations to provide a signal indicative of the wheel sliding when the degree of rotation is less than said pre-determined range, and providing a signal indicative of the wheel slipping when said degree of rotation is greater than said pre-determined range.

* * * * *